US012040559B2

(12) United States Patent
Sun et al.

(10) Patent No.: US 12,040,559 B2
(45) Date of Patent: Jul. 16, 2024

(54) ULTRA-WIDEBAND MOBILE MOUNT ANTENNA APPARATUS HAVING A CAPACITIVE GROUND STRUCTURE-BASED MATCHING STRUCTURE

(71) Applicant: Viavi Solutions Inc., Chandler, AZ (US)

(72) Inventors: Dexin Sun, Indianapolis, IN (US); Raleigh B. Stelle, IV, Indianapolis, IN (US)

(73) Assignee: Viavi Solutions Inc., Chandler, AZ (US)

(*) Notice: Subject to any disclaimer, the term of this patent is extended or adjusted under 35 U.S.C. 154(b) by 0 days.

(21) Appl. No.: 17/929,928

(22) Filed: Sep. 6, 2022

(65) Prior Publication Data

US 2023/0092919 A1 Mar. 23, 2023

Related U.S. Application Data

(63) Continuation of application No. 16/451,849, filed on Jun. 25, 2019, now Pat. No. 11,469,502.

(51) Int. Cl.

| | |
|---|---|
| ***H01Q 5/25*** | (2015.01) |
| ***H01Q 1/22*** | (2006.01) |
| ***H01Q 1/32*** | (2006.01) |
| ***H01Q 1/48*** | (2006.01) |
| ***H01Q 9/30*** | (2006.01) |
| ***H01Q 19/10*** | (2006.01) |

(52) U.S. Cl.

CPC ................. *H01Q 5/25* (2015.01); *H01Q 1/32* (2013.01); *H01Q 1/48* (2013.01); *H01Q 9/30* (2013.01); *H01Q 19/10* (2013.01); *H01Q 1/2283* (2013.01)

(58) Field of Classification Search

CPC .. H01Q 9/40; H01Q 5/25; H01Q 9/30; H01Q 19/10; H01Q 1/3275; H01Q 1/38

See application file for complete search history.

(56) References Cited

U.S. PATENT DOCUMENTS

| | | | | |
|---|---|---|---|---|
| 4,072,952 A * | 2/1978 | Demko | H01Q 1/283 | 343/729 |
| 4,092,646 A * | 5/1978 | Newington | H01Q 9/32 | 343/715 |
| 5,828,340 A * | 10/1998 | Johnson | H01Q 9/36 | 343/846 |
| 5,844,525 A * | 12/1998 | Hayes | H01Q 5/49 | 343/702 |

(Continued)

FOREIGN PATENT DOCUMENTS

| | | | |
|---|---|---|---|
| EP | 2309589 B1 * | 1/2016 | G06K 19/07718 |

OTHER PUBLICATIONS

N. W. Chen, et al., "An Ultra-Broadband, Coplanar-Waveguide Fed Circular Monopole Antenna with Improved Radiation Characteristics", Progress in Electromagnetics Research C., vol. 9, pp. 193-207, (2009).

(Continued)

*Primary Examiner* — Ricardo I Magallanes

(74) *Attorney, Agent, or Firm* — DLA Piper LLP (US)

(57) ABSTRACT

An ultra-wideband mobile mount antenna with a capacitive ground structure-based matching structure. The antenna has a return loss better than 10 dB over an operating frequency range of 250 MHz to 1220 MHz.

20 Claims, 13 Drawing Sheets

(56) References Cited

U.S. PATENT DOCUMENTS 5,943,027 A * 8/1999 Thill ........ H01Q 1/244 343/702
6,181,282 B1 * 1/2001 Gans ........ H01Q 1/38 343/702
6,417,807 B1 * 7/2002 Hsu ........ H01Q 9/285 343/781 CA
6,421,024 B1 * 7/2002 Stolle ........ H01Q 9/285 343/792
6,542,128 B1 * 4/2003 Johnson ........ H01Q 9/28 343/826
6,611,150 B1 * 8/2003 Stevens ........ G01R 31/52 324/95
6,781,562 B1 * 8/2004 Lungwitz ........ H01Q 9/32 343/900
6,906,672 B1 * 6/2005 Miller ........ H01Q 1/38 343/744
6,937,193 B2 * 8/2005 Hendler ........ H01Q 1/38 343/846
7,342,553 B2 * 3/2008 Soler Castany ........ H01Q 5/371 343/702
7,385,560 B1 * 6/2008 Maloratsky ........ H01Q 9/32 343/705
8,081,122 B2 * 12/2011 Kearney ........ H01Q 9/42 343/702
8,466,843 B1 * 6/2013 Doane ........ H01Q 9/30 343/893
8,736,504 B1 * 5/2014 West ........ H01Q 13/106 343/770
9,711,866 B1 * 7/2017 Doane ........ H01Q 19/13
9,899,733 B1 * 2/2018 Platt ........ H01Q 1/42
10,411,357 B1 * 9/2019 Ashraf ........ H01Q 9/40
10,734,726 B2 * 8/2020 Fujimoto ........ H01Q 9/0407
11,140,016 B1 * 10/2021 Hoffman ........ H04L 27/2657
2002/0158798 A1 * 10/2002 Chiang ........ H01Q 9/32 342/372
2004/0027304 A1 * 2/2004 Chiang ........ H01Q 3/446 343/810
2004/0070545 A1 * 4/2004 Ikeda ........ H01Q 9/32 343/756
2004/0100408 A1 * 5/2004 Okado ........ H01Q 1/38 343/846
2004/0196189 A1 * 10/2004 Yeh ........ H01Q 1/38 343/846
2004/0233121 A1 * 11/2004 Lin ........ H01Q 9/30 343/702
2004/0246192 A1 * 12/2004 Sugawara ........ H01Q 3/00 343/825
2004/0257292 A1 * 12/2004 Wang ........ H01Q 15/148 343/834
2005/0128162 A1 * 6/2005 Takagi ........ H01Q 1/243 343/905
2005/0237258 A1 * 10/2005 Abramov ........ H01Q 21/205 343/834
2005/0248487 A1 * 11/2005 Okado ........ H01Q 1/48 343/846
2006/0022890 A1 * 2/2006 Chiang ........ H01Q 19/22 343/834
2006/0214869 A1 * 9/2006 Kuroda ........ H01Q 9/30 343/846
2006/0248565 A1 * 11/2006 Shimp ........ H04N 7/106 725/62
2007/0030210 A1 * 2/2007 Shibata ........ H01Q 19/32 343/893
2007/0285324 A1 * 12/2007 Waterhouse ........ H01Q 1/273 343/718
2008/0055183 A1 * 3/2008 Yuba ........ H01Q 9/40 343/872
2009/0128442 A1 * 5/2009 Fujita ........ H01Q 5/385 343/907
2009/0174608 A1 * 7/2009 Park ........ H01Q 9/0442 343/700 MS
2009/0267849 A1 * 10/2009 Yun ........ H01Q 7/00 343/726
2010/0136912 A1 * 6/2010 Mohammadian ........ H01Q 1/242 343/702
2010/0289707 A1 * 11/2010 Takamura ........ H01Q 1/38 343/702
2011/0080330 A1 * 4/2011 Lee ........ H01Q 1/38 343/785
2011/0134011 A1 * 6/2011 Yamagajo ........ H01Q 23/00 343/860
2011/0193755 A1 * 8/2011 Lindenmeier ........ H01Q 1/3275 343/715
2012/0013520 A1 * 1/2012 Hanson ........ H01Q 9/40 343/848
2013/0021207 A1 * 1/2013 Lee ........ H01Q 1/38 29/401.1
2013/0035050 A1 * 2/2013 Gao ........ H03F 1/223 455/193.1
2013/0321093 A1 * 12/2013 Ueda ........ H01P 1/32 333/17.1
2014/0097995 A1 * 4/2014 McKinzie, III ........ H01Q 21/26 29/601
2015/0042535 A1 * 2/2015 Orban ........ H01Q 9/42 343/893
2015/0123868 A1 * 5/2015 Bit-Babik ........ H01Q 9/0464 29/600
2017/0025750 A1 * 1/2017 Su ........ H01Q 1/50
2017/0047665 A1 * 2/2017 Yang ........ H01Q 19/005
2017/0180166 A1 * 6/2017 Zhou ........ H04B 1/525
2017/0201002 A1 * 7/2017 Huggins ........ H01Q 1/02
2017/0251207 A1 * 8/2017 Bush ........ H04N 21/6168
2017/0302003 A1 * 10/2017 Elsallal ........ H01Q 21/061
2017/0317416 A1 * 11/2017 Jervis ........ H01Q 1/50
2018/0006378 A1 * 1/2018 Abe ........ H01Q 1/48
2018/0034164 A1 * 2/2018 Jang ........ H01Q 15/246
2018/0138599 A1 * 5/2018 Shehan ........ H01Q 9/32
2018/0358707 A1 * 12/2018 Jamaly ........ H01Q 9/40
2019/0044224 A1 * 2/2019 Kim ........ H01Q 7/00
2019/0044231 A1 * 2/2019 Zaric ........ H01Q 1/48
2019/0140692 A1 * 5/2019 Sun ........ H01Q 5/50
2019/0386383 A1 * 12/2019 Shehan ........ H01Q 1/52
2020/0021029 A1 * 1/2020 Chou ........ H01Q 9/0421
2020/0161753 A1 * 5/2020 Pan ........ H01Q 21/28
2020/0251826 A1 * 8/2020 Onaka ........ H01Q 9/40
2020/0266540 A1 * 8/2020 Harel ........ H01Q 21/24
2020/0350686 A1 * 11/2020 Nemeth, III ........ H01Q 1/424
2020/0411985 A1 * 12/2020 Sun ........ H01Q 19/10

OTHER PUBLICATIONS

M.K. Khandelwal, et al., "Defected Ground Structure: Fundamentals, Analysis, and Applications in Modern Wireless Trends", International Journal of Antennas and Propagation, vol. 2017, 22 pages, (2017).

* cited by examiner

ULTRA-WIDEBAND MOBILE MOUNT ANTENNA APPARATUS HAVING A CAPACITIVE GROUND STRUCTURE-BASED MATCHING STRUCTURE

CROSS-REFERENCE TO RELATED APPLICATION

This application is a Continuation Application of U.S. application Ser. No. 16/451,849, filed Jun. 25, 2019, the entire disclosure of which has been incorporated by reference herein.

DETAILED DESCRIPTION OF SEVERAL EMBODIMENTS

Figure 1:
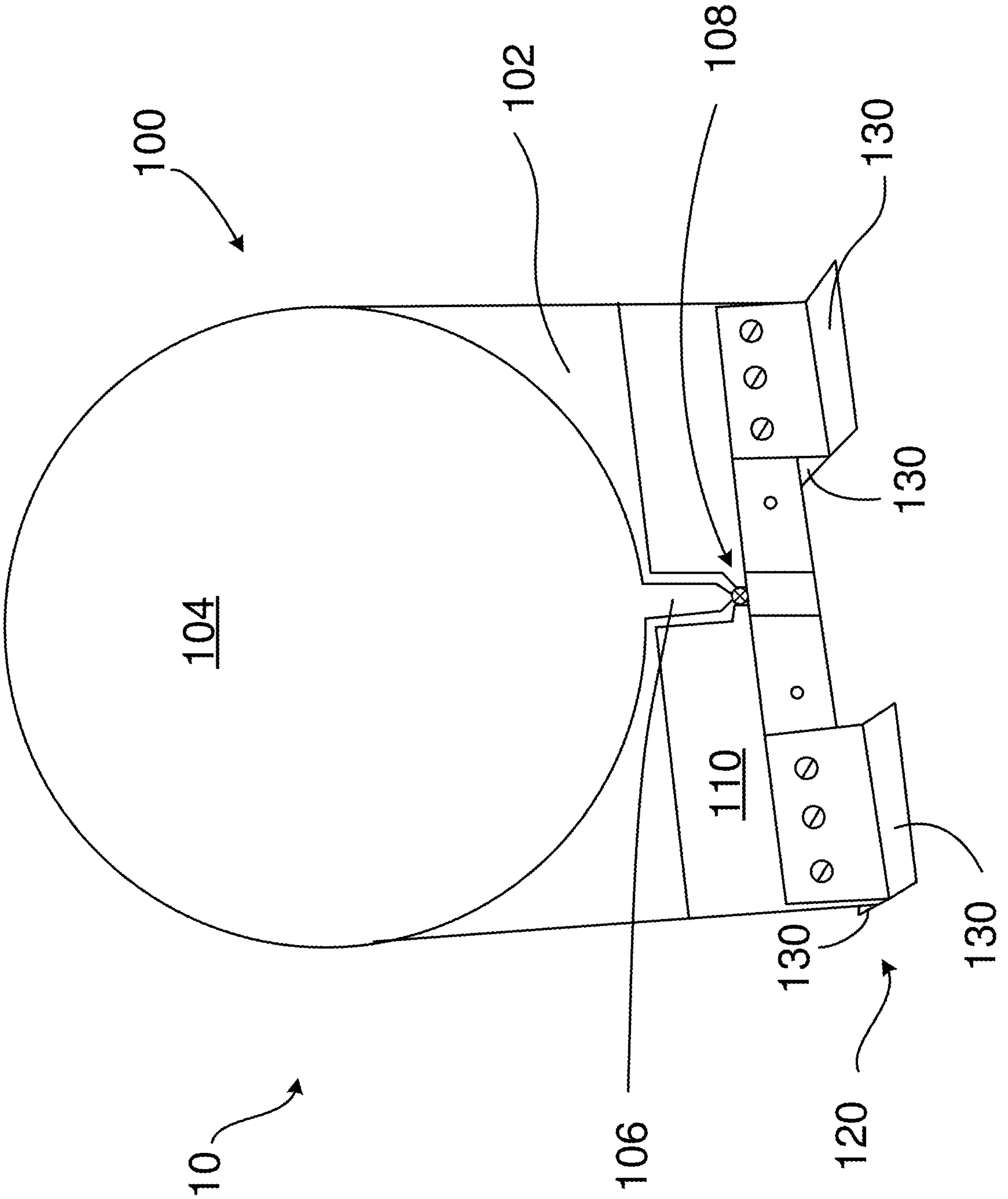
FIG. 1 shows an example embodiment of an antenna apparatus comprising an ultra-wideband antenna and a capacitive ground structure-based matching structure in accordance with the disclosed principles.

Embodiments described herein may be configured to provide an ultra-wideband antenna apparatus. In one embodiment, the apparatus comprises a monopole antenna portion formed on a first side of a printed circuit board; a ground pad formed on the first side of the printed circuit board and spaced apart from the antenna portion; and a capacitive ground structure-based matching structure coupled to the ground pad.

It is known in the art that broadband distribution networks, in particular cable TV (CATV) Hybrid Fiber-Coaxial (HFC) networks, commonly carry signals in their coaxial portions that may produce harmful interference to other adjacent electronic systems if allowed to radiate outside of the coaxial cable portion of the network. For instance, the FCC in the United States and Industry Canada in Canada have both had, for many years now, regulations governing the allowable "leakage" from the network of frequencies in the aeronautical VHF (very high frequency) radio band to help avoid known causes of air traffic control interference by terrestrial radiation sources. Furthermore, it is well known that other sources of terrestrial off-air radio signals like LTE (Long-Term Evolution) and other signals can intrude into the network (commonly referred to as ingress) causing signal degradation for the consumers of the HFC network's signals, which may cause anything from TV channel pixelization to reduced Internet speeds to consumers. The complexity and size of the distribution network require that network operation and performance be periodically tested and/or monitored.

Two tests often performed by CATV service providers are signal level monitoring and leakage detection. CATV service providers use signal level monitors to measure the signal level of particular channel frequencies at any part of the distribution network. For example, a technician connects the signal level monitor to the coaxial cable at any location within the distribution network. The signal level monitor allows the technician to obtain data regarding the frequency response of the distribution network and identify network-related signal transmission problems.

Leakage detectors are devices that detect and/or measure the leakage of CATV signals to the exterior of the coaxial cable. If the coaxial cable is insufficiently shielded, significant levels of the CATV signals may leak to the environment surrounding the cable. Government regulations permit only a finite level of coaxial cable leakage. Leakage detectors help determine compliance with government regulations and can otherwise provide information as to the performance of particular sections of a coaxial cable.

In one embodiment, the leakage detector may be part of a mobile leakage detector system mounted on and or within a vehicle. At a minimum, the mobile leakage detector system requires a wideband antenna to detect leakage signals within the desired frequency range of 250 MHz to 1220 MHz (1.2 GHz). Normally, a planar circular wideband monopole antenna with a 6 inch diameter can be used cover the 600 MHz to 1220 MHz range while a second, larger antenna with an 11.8 inch diameter can be used to cover the 250 MHZ to 600 MHz range. Therefore, in the conventional system, two antennas and a diplexer device are needed to cover the frequency range of 250 MHz to 1220 MHz. However, since the size of the two antennas are too big to be effectively mounted on a vehicle's roof, this system is not a good solution for a real world mobile application. The shortcomings of the two-antenna solution are compounded when an additional antenna and corresponding circuitry are required to detect leakage at frequencies below 250 MHZ.

Accordingly, there is a need and desire for a single and preferably compact antenna for a mobile leakage detector system that can be used to detect leakage signals within the frequency range of 250 MHz to 1220 MHz.

It should be appreciated that when developing an ultra-wideband antenna for the 250 MHz to 1220 MHz frequency range, the proper antenna size and peak gain should be considered. For example, an 8.5 inch diameter circular antenna may meet the frequency range requirements, but may experience a 5 dB return loss at approximately 250 MHz. This would adversely impact the antenna's gain performance. Since a 5 dB return loss will create a large mismatching loss and reduce the antenna's efficiency, a matching circuit could be considered to solve this problem. Theoretically, a narrow band matching circuit at 250 Mz could be used, but this circuit will create high-band mismatching issues. A wideband matching circuit, on the other hand, also is not desirable due to the difficulty of simulating necessary circuit elements resulting from the complex antenna impedance at the wideband range. Moreover, it is difficult to place a matching circuit at the antenna's output port, particularly for a mobile system.

In accordance with the disclosed principles, in one or more embodiments, a new matching structure comprising one or more capacitive ground structures (i.e., a "capacitive ground structure-based matching structure") has been created to solve the low band mismatching issue described above. Each capacitive ground structure (CGS) comprises a conductive sheet (e.g., metal) having a particular size that is folded at a desired angle (e.g., a right angle) to form two portions. A first portion (e.g., a substantially vertical portion) of one or more capacitive ground structures is attached to the grounding pad of the antenna's printed circuit board (PCB) and another portion (e.g., a substantially horizontal portion) is mounted over and spaced apart from a metal reflector (e.g., a vehicle's metal roof when the apparatus is used in a mobile system) to create a distributed capacitance used for antenna matching. The capacitance value is determined by the size of the capacitive ground structures and the space between their horizontal portions and the reflector.

FIG. 1 shows an example embodiment of an antenna apparatus 10 comprising an ultra-wideband antenna 100 and a matching structure 120 constructed in accordance with the disclosed principles. In the illustrated embodiment, the matching structure 120 comprises four capacitive ground structures 130, two on each side of the apparatus 10. The make-up and configuration of the capacitive ground structure 130 are described below in more detail with respect to FIG. 2. It should be appreciated that the matching structure 120 may comprise more or less capacitive ground structures 130 depending upon the type and degree of antenna matching required.

In one embodiment, the ultra-wideband antenna 100 may be a planar circular monopole antenna (PCMA) having an antenna portion 104, a co-planar waveguide (CPWG) 106 and an antenna output 108 formed on a first side of a printed circuit board 102. In one embodiment, a ground pad 110 is also formed on the first side of the printed circuit board 102. Details of the antenna 100 are discussed below with respect to FIG. 3. It should be appreciated that the disclosed matching structure 120 can be used on different shaped planar antennas, if desired.

Figure 2:
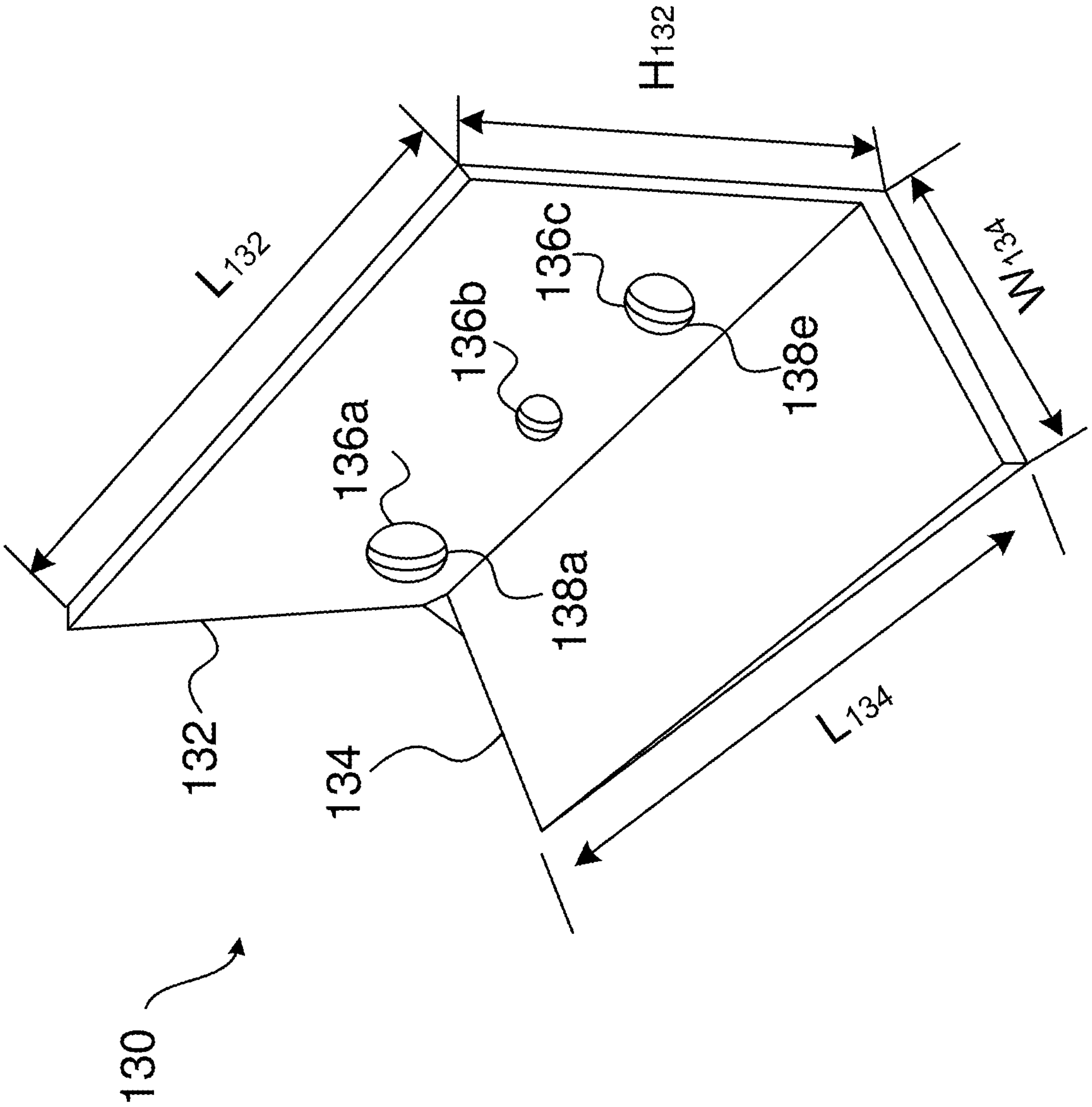
FIG. 2 shows an example embodiment of a capacitive ground structure illustrated in FIG. 1.

Turning to FIG. 2, an example embodiment of a capacitive ground structure 130 is now described. In one embodiment, the capacitive ground structure 130 may be formed from a conductive material such as metal. In one embodiment, the conductive material may be aluminum. It should be appreciated that other metals including e.g., brass, copper, gold, steel, titanium, tin and stainless steel could be used to form the capacitive ground structure 130 and that the claimed invention should not be limited to the specific conductive materials disclosed herein.

In one embodiment, the capacitive ground structure 130 may be bent or folded such that is has two portions, a substantially vertical portion 132 and a substantially horizontal portion 134. In the illustrated embodiment, the capacitive ground structure 130 is bent such that the substantially vertical portion 132 and the substantially horizontal portion 134 form a right angle with respect to each other. It should be appreciated that other angles can be formed depending upon the type and degree of antenna matching required.

In one embodiment, and as shown in FIG. 1, the substantially vertical portion 132 of one or more capacitive ground structures 130 is placed in contact with the ground pad 110 on the first side of the printed circuit board 102. In addition, the substantially vertical portion 132 of one or more capacitive ground structures 130 is placed in contact with the second side of the printed circuit board 102, which may comprise connector mounting hole pads if desired. Thus, the substantially vertical portion 132 may comprise one or more holes $\mathbf{136}_a$, $\mathbf{136}_b$, $\mathbf{136}_c$ configured to match the configuration of one or more holes $\mathbf{112}_a$, $\mathbf{112}_b$, $\mathbf{112}_c$, $\mathbf{114}_a$, $\mathbf{114}_b$, $\mathbf{114}_c$ (FIG. 3) in the printed circuit board 102. In one embodiment, one or more attachment mechanisms $\mathbf{138}_a$, $\mathbf{138}_e$ (e.g., screws, nuts and bolts, rivets, welds, etc.) configured to fit within the one or more holes $\mathbf{136}_a$, $\mathbf{136}_b$, $\mathbf{136}_c$ in the substantially vertical portion 132 and the holes $\mathbf{112}_a$, $\mathbf{112}_b$, $\mathbf{112}_c$, $\mathbf{114}_a$, $\mathbf{114}_b$, $\mathbf{114}_c$ in the printed circuit board 102 may be used to secure the capacitive ground structure 130 to another capacitive ground structure 130 on the opposite side of the apparatus 10 (as shown in FIG. 1). It should be appreciated that the attachment mechanisms $\mathbf{138}_a$, $\mathbf{138}_e$ could be configured to secure the capacitive ground structure 130 directly to the antenna's PCB 102 as opposed to connecting it to another capacitive ground structure 130, if desired.

In one embodiment, the substantially vertical portion 132 may have a height $H_{132}$ of 1.5 inches and a length $L_{132}$ of 2 inches. In one embodiment, the substantially horizontal portion 134 may have a width $W_{134}$ of 1 inch and a length $L_{134}$ of 2 inches. In one embodiment, the thickness of both portions 132, 134 of the capacitive ground structure 130 may be 80 mils (i.e., 0.08 inches). It should be appreciated that the dimensions of the portions 132, 134 may be changed depending upon the number of capacitive ground structures 130 utilized in the apparatus 10. That is, it may be desirable to use less, but longer, capacitive ground structures 130 instead of the four structures 130 illustrated in FIG. 1. Likewise, it may be desirable to use six or more shorter structures 130 instead of the four structures 130 illustrated in FIG. 1. Moreover, the thickness and dimensions of the portions 132, 134 may be changed depending upon the type and degree of antenna matching required.

Figure 3:
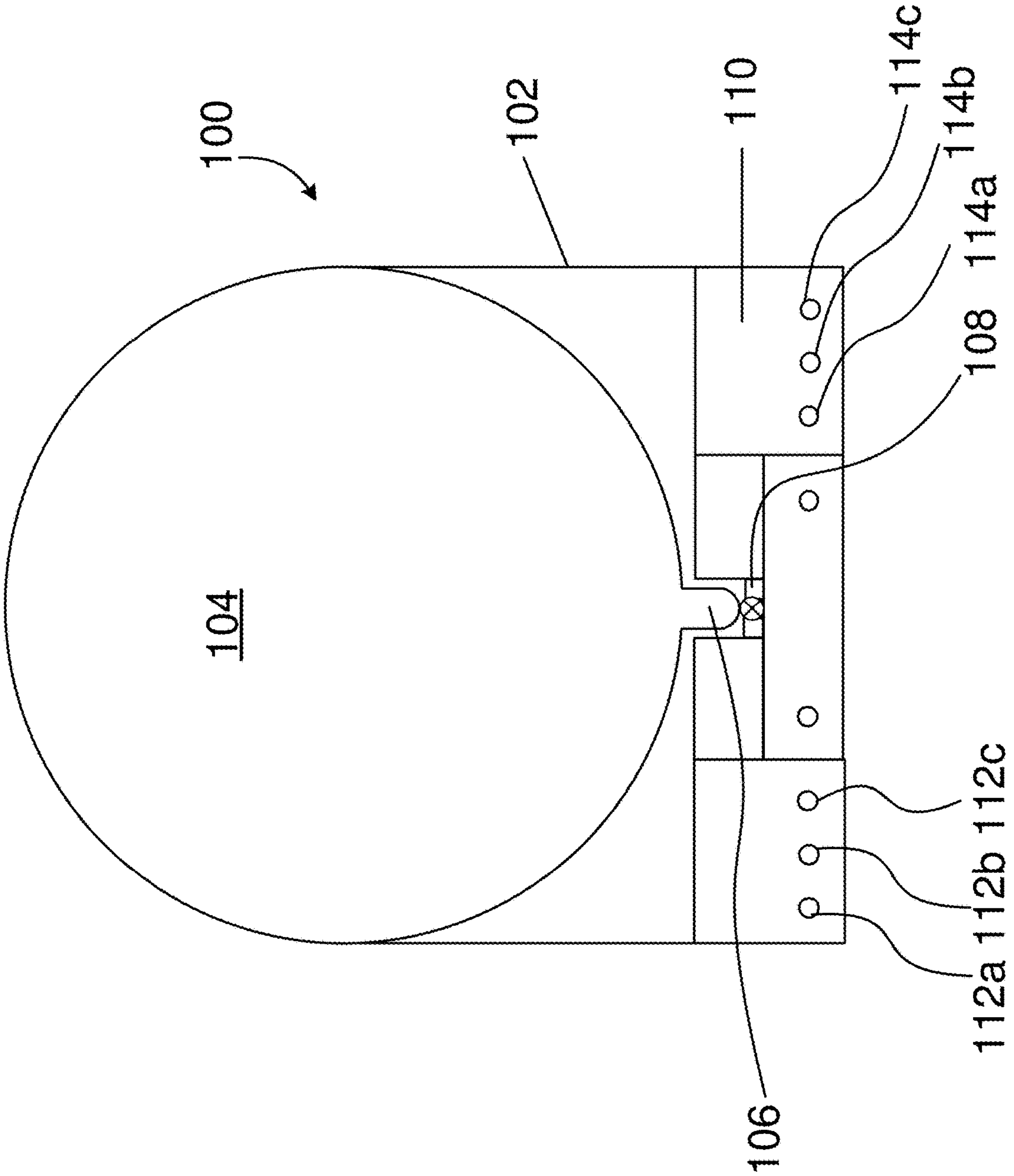
FIG. 3 shows an example embodiment of the ultra-wideband antenna illustrated in FIG. 1.

Referring to FIGS. 1 and 3, further details of the ultra-wideband antenna 100 are now discussed. For example, in one embodiment, the printed circuit board 102 may be any conventional printed circuit board comprising any conventional substrate and a least one copper layer. In one embodiment, the printed circuit board 102 has an FR4 substrate and may have a thickness of approximately 62 mils (i.e., 0.062 inches). In one embodiment, the antenna portion 104, co-planar waveguide (CPWG) 106 and ground pad 110 are exposed portions of the PCB's 102 copper layer.

In one embodiment, the circular diameter of the antenna portion may be 8.5 inches, the width of the co-planar waveguide 106 may be 500 mils (i.e., 0.5 inches), the gap between the ground pad 110 and the co-planar waveguide 106 is 80 mils (i.e., 0.08 inches), and the gap between the ground pad 110 and the antenna portion is 100 mils (i.e., 0.1 inches). In the illustrated embodiment, the printed circuit board 102 may have a height of 10.5 inches. In one or more embodiments, the antenna output 108 may include an RF connector, such as e.g., an SMA (SubMiniature version A) connector, BNC (Bayonet Neill-Concelman) connector, an F connector, and the like.

The disclosed antenna apparatus 10 is different from a traditional antenna in that it comprises the co-planar waveguide (CPWG) 106 and uses the printed circuit board's 102 ground pad 110 and the metal reflector to improve efficiency and peak gain in comparison to a traditional antenna. That is, the disclosed antenna apparatus 10 uses hybrid grounding reflectors including a ground pad and metal reflector (e.g., a metal ground plane such as vehicle's roof in a mobile system), to achieve better antenna efficiency and peak gain than the traditional antenna (which may be used in a wireless communication application with only a coplanar waveguide or micro strip ground pad as a reflector).

In use, the peak gain of the disclosed antenna apparatus 10 is approximately 1 dBi at 250 MHz. In one embodiment, the gain linearly increases to 4 dBi up to 600 MHz, and is greater than 4 dBi at frequencies between 600 MHz and 1220 MHz (1.2 GHz).

Figure 4A:
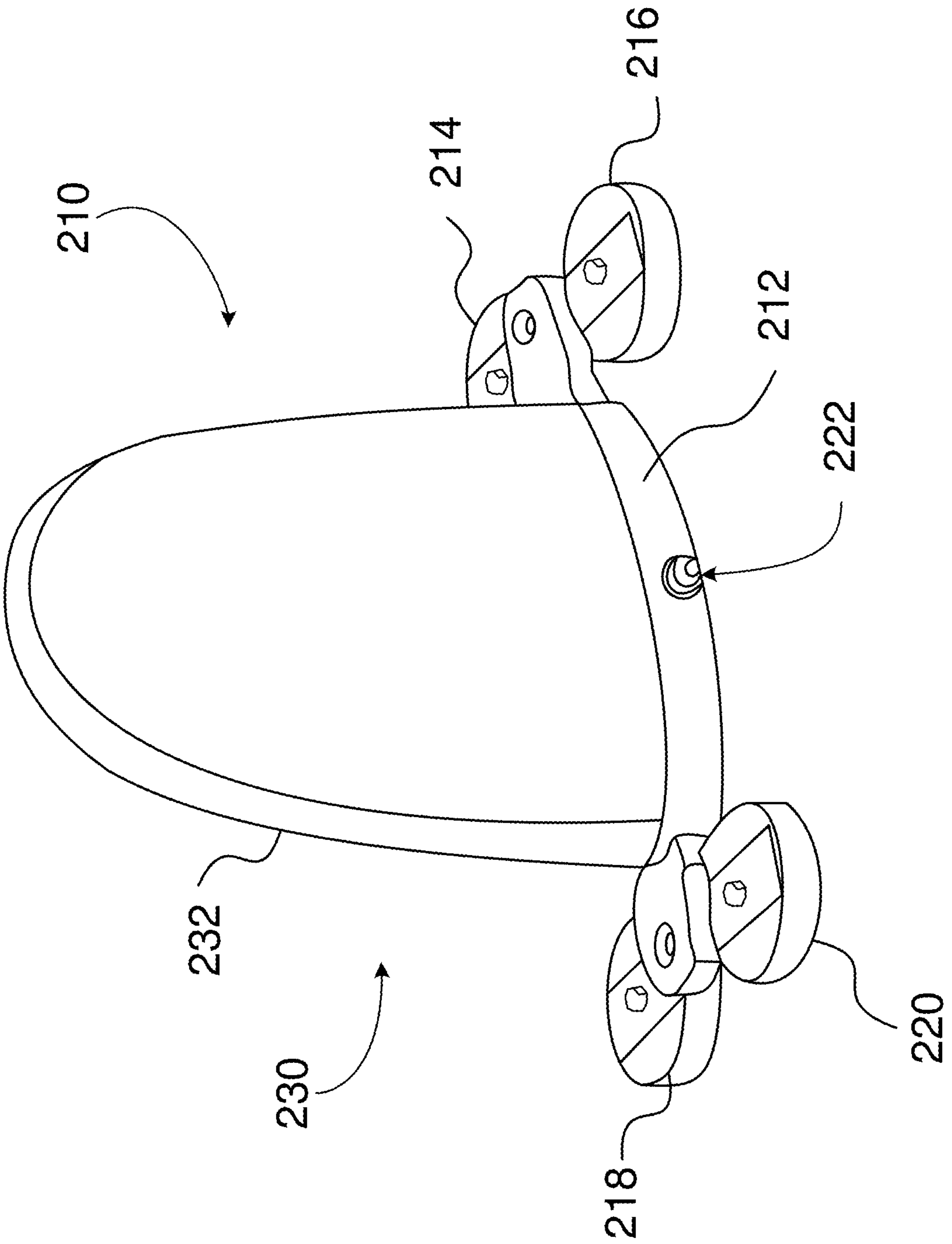
FIG. 4A shows an example embodiment of an antenna apparatus having a weather protective housing protecting the antenna apparatus illustrated in FIG. 1.

FIG. 4A shows an example embodiment of an antenna apparatus 210 comprising a weather protective housing 230 over the antenna apparatus 10 illustrated in FIG. 1. The weather protective housing 230 comprises a first portion 232, for covering a majority of the antenna apparatus 10 illustrated in FIG. 1, connected to a base portion 212. The base portion 212 may include one or more extensions 214, 216, 218, 220 that may be used e.g., to cover connection mechanisms (e.g., magnetic connection mechanisms 244, 246, 248, 250 illustrated in FIG. 4B) used to mount the apparatus 210 to a reflector (e.g., a metal ground plane such as vehicle's roof in a mobile system). In the illustrated embodiment, a connector 222 connected to or part of the antenna output is shown extending through the base 212 so the antenna output of the apparatus 210 can be connected to a cable. As can be appreciated, the protective housing 230 may help ensure that the antenna apparatus 10 does not corrode or otherwise become damaged by the elements.

Figure 4B:
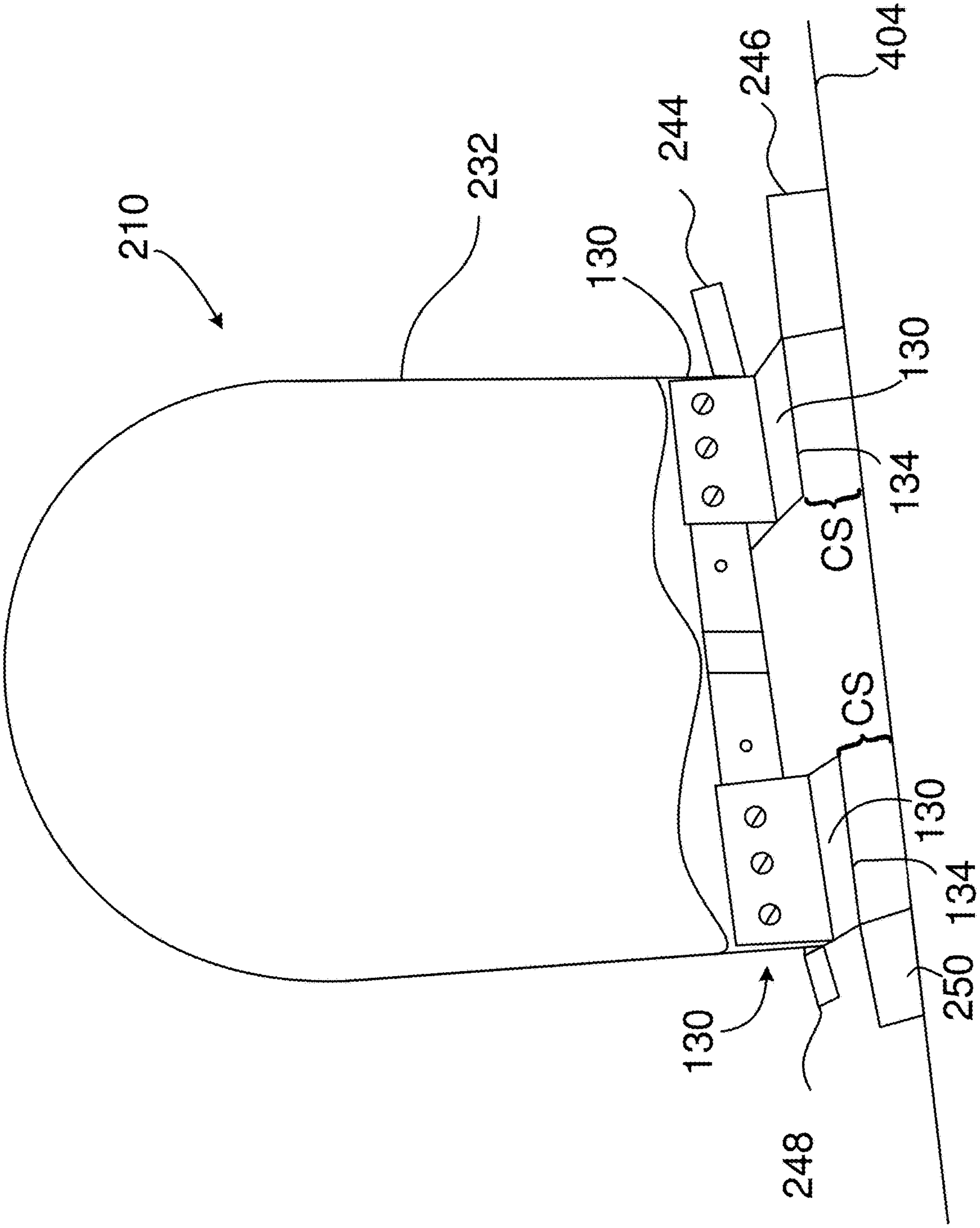
FIG. 4B shows the antenna apparatus of FIG. 4A coupled to a metal reflector.

FIG. 4B shows the antenna apparatus 210 coupled to a reflector 404 (e.g., metal roof of a vehicle in a mobile system) via one or more connection mechanisms 244, 246, 248, 250 to create a distributed capacitance for antenna matching in accordance with the disclosed principles. In FIG. 4B, the first portion 232 of the protective housing is shown partially removed to expose the capacitive ground structures 130 for illustrative purposes only. By way of example, and as shown in FIG. 4B, the one or more connection mechanisms 244, 246, 248, 250 are configured to leave a space CS between the bottom surface of the substantially horizontal portions 134 and the reflector 404. In one embodiment, the capacitance value may be determined by the size of the capacitive ground structures 130 and the space CS between their horizontal portions 134 and the reflector 404. In one embodiment, the one or more connection mechanisms 244, 246, 248, 250 do not contact the substantially horizontal portions 134 or the printed circuit board 102 to ensure that the distributed capacitance is achieved.

In one embodiment, the one or more connection mechanisms 244, 246, 248, 250 may be magnetic connection mechanisms configured to magnetically couple the apparatus 210 to the reflector 404. In one embodiment, the one or more connection mechanisms 244, 246, 248, 250 are held within or integral with the one or more extensions 214, 216, 218, 220 illustrated in FIG. 4A. The use of magnetic connection mechanisms allows the apparatus 210 to be removed from the reflector 404, if desired. It should be appreciated that the connection mechanisms 244, 246, 248, 250 do not have to be magnetic; instead, the connection mechanisms 244, 246, 248, 250 may be some form of a permanent attachment mechanism that permanently mounts the antenna apparatus 210 to the reflector 404.

Figure 5:
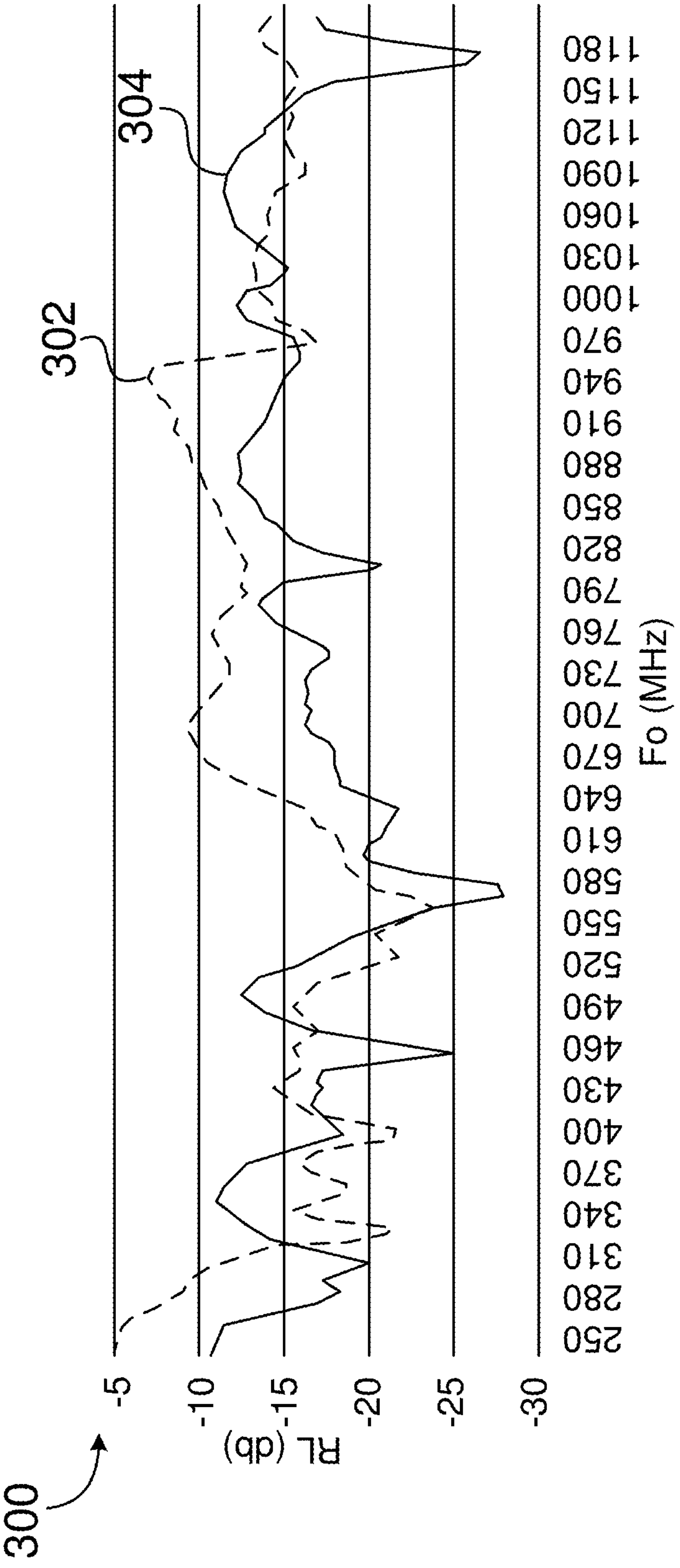
FIG. 5 shows a graph illustrating an example of the return loss of the disclosed ultra-wideband antenna with the capacitive ground structure-based matching structure versus an ultra-wideband antenna without the disclosed capacitive ground structure-based matching structure.

FIG. 5 shows a graph 300 illustrating an example of the return loss of the disclosed antenna apparatus 10, 210 versus an ultra-wideband antenna without the disclosed capacitive ground structure-based matching structure. Line 302 is the return loss plot of the antenna without the disclosed capacitive ground structure-based matching structure 120 and line 304 is the return loss plot of the disclosed antenna apparatus 10, 210. As can be seen, the disclosed antenna apparatus 10, 210 is about 5 dB better than the other antenna at 250 MHz. Moreover, as can be seen from the graph 300, the disclosed antenna apparatus 10, 210 has a return loss greater than 10 dB throughout the whole frequency range between 250 MHz and 1220 MHz, which is a substantial improvement over the antenna without the disclosed capacitive ground structure matching structure. In addition, the disclosed antenna apparatus 10 has a VSWR (Voltage Standing Wave Ratio) less than 2, which as known in the antenna art is more than suitable for most antenna applications.

Figure 6:
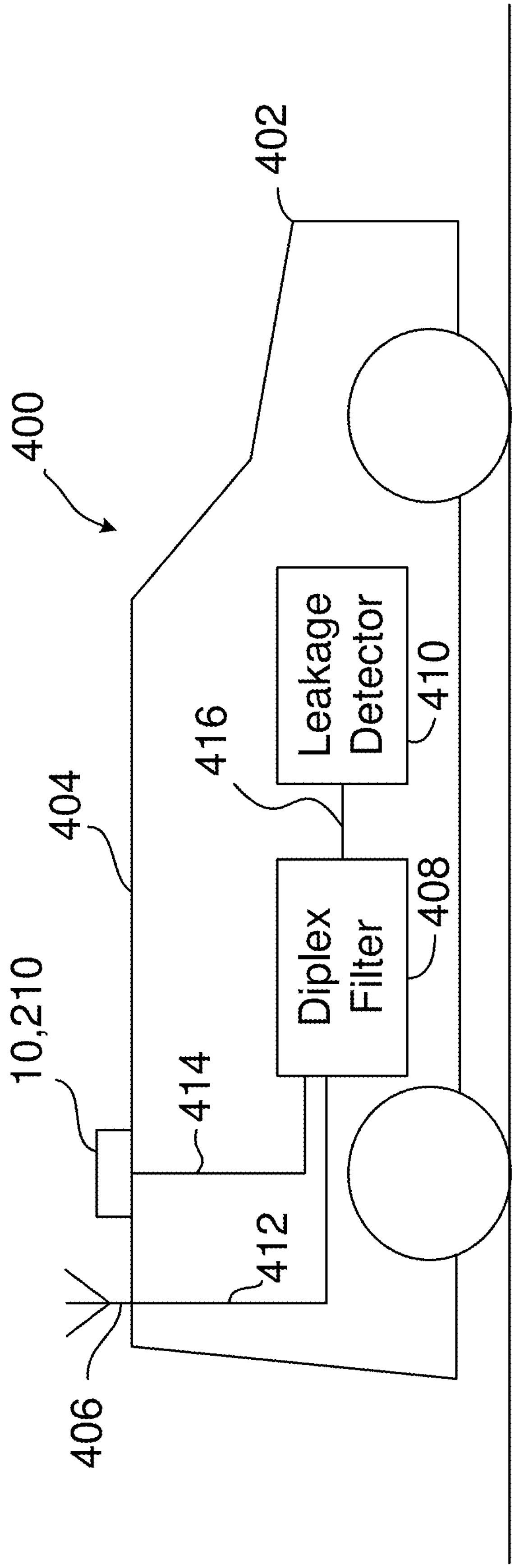
FIG. 6 shows an example embodiment of a mobile leakage detector system constructed in accordance with the disclosed principles.

FIG. 6 shows an example embodiment of a mobile leakage detector system 400 constructed in accordance with the disclosed principles. The system 400 is implemented using a vehicle 402. The system 400 may include an antenna apparatus 10, 210 constructed in accordance with the disclosed principles that may be attached to the metal roof 404 of the vehicle 402. As noted above, the antenna apparatus 10, 210 is mounted such that capacitive ground structures 130 are positioned slightly above the roof 404, creating a capacitive plate relative to the metal of the roof 404. In one embodiment, a metal plate can be attached to the vehicle 402 if the vehicle itself does not have a metal roof 404 (e.g., if the vehicle is a golf cart or other vehicle with a non-metallic roof).

In one embodiment, an optional second antenna 406 may be included to detect frequencies below 250 MHZ, which may be required in certain geographical areas. If the second antenna 406 is used, the outputs of the disclosed antenna apparatus 10, 210 and the second antenna 406 are connected via cabling 414, 412, respectively, to inputs of a diplex filter 408. The output of the diplex filter 408 is connected to an input of a leakage detector 410 via cabling 416. If the system 400 only includes the antenna apparatus 10, 210 disclosed herein, then the output of the antenna apparatus 10, 210 may be directly coupled to the input of the leakage detector 410.

In one embodiment, the leakage detector 410 is mounted within the vehicle 402 using a vehicle mobile mount (not shown). In one embodiment, the leakage detector 410 may be a leakage detector from the line of Seeker™ leakage detectors manufactured and sold by VIAVI SOLUTIONS INC. In one embodiment, the leakage detector 410 may be GPS-capable (such as e.g., the Seeker™ GPS leakage detector) or coupled through a port provided for this purpose to a commercially available GPS instrument, such as one of the Garmin® or TomTom® GPS instruments capable of outputting GPS data in a standard format acceptable by the leakage detector 410.

In one embodiment, the leakage detector 410 is designed to detect the presence of the smallest amounts of signal leakage out of the HFC plant. In one embodiment, the leakage detector 410 may be able to "look" for these signals over the entire "downstream" bandwidth of the HFC network. Therefore, the system 400 needs an antenna system that makes the receiver in the leakage detector 410 optimally sensitive to these signals over a very wide range of frequencies. The antenna apparatus 10, 210 disclosed herein is designed to cover the bandwidth of 250 MHz to 1220 MHz. In the illustrated embodiment, the system 400 includes a second antenna 406, which may be a ¼ wave monopole antenna that may allow the system 400 to monitor a particular frequency in the band between 130 MHz to 150 MHz. In this way, the system 400 may have nearly continuous coverage in terms of frequency over the entire possible monitoring range, allowing the system 400 to detect all possible vulnerabilities of the HFC system both in terms of signal ingress from the outside and signal leakage from the HFC network. It should be appreciated that for many international applications, e.g., in environments where some regulations do not exist, the additional single frequency antenna 406 may not be needed at all.

Figure 7A:
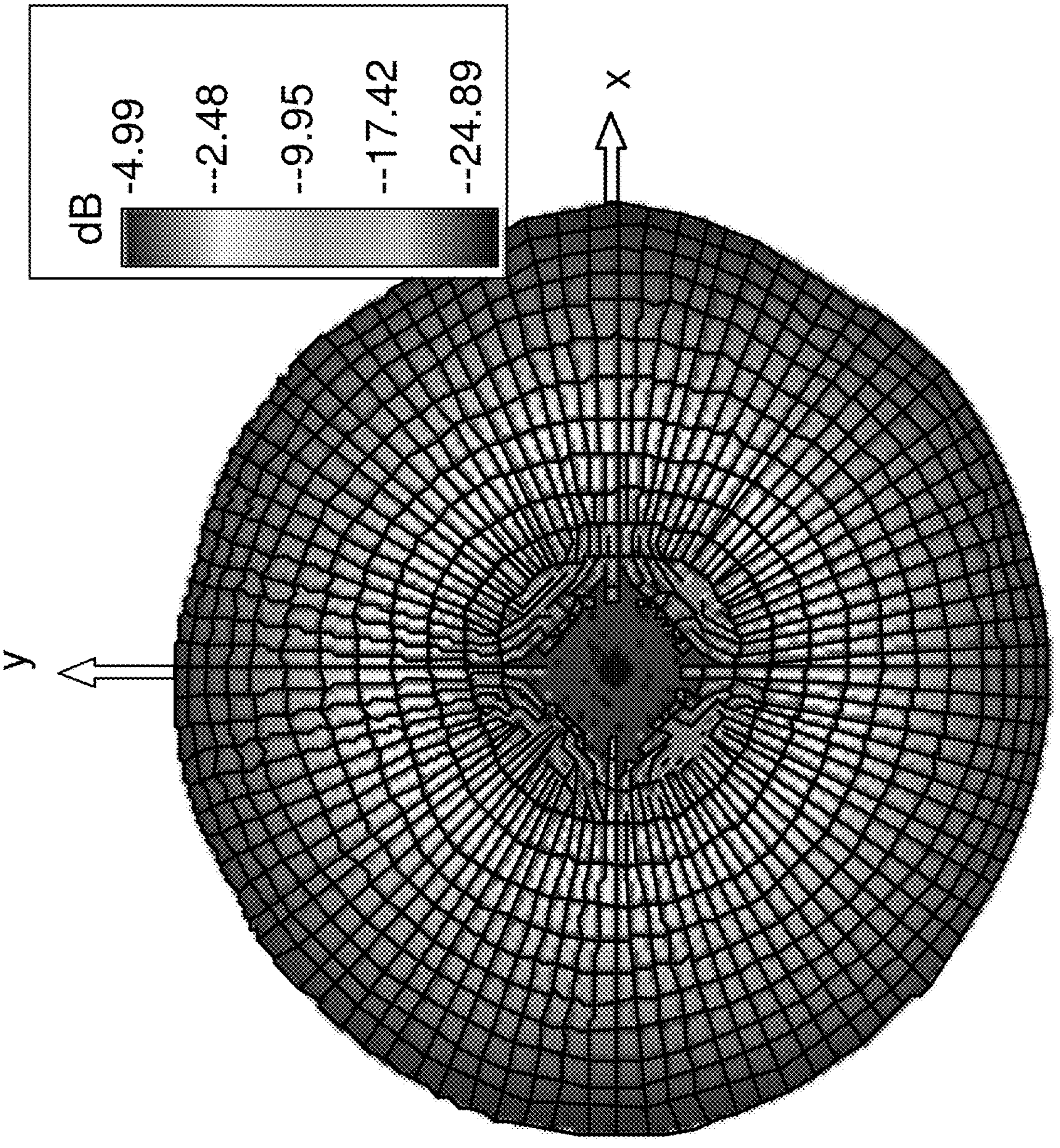
FIGS. 7A-7F show example three-dimensional (3D) radiation patterns of the disclosed antenna apparatus at a frequency of 700 MHz.
Figure 7B:
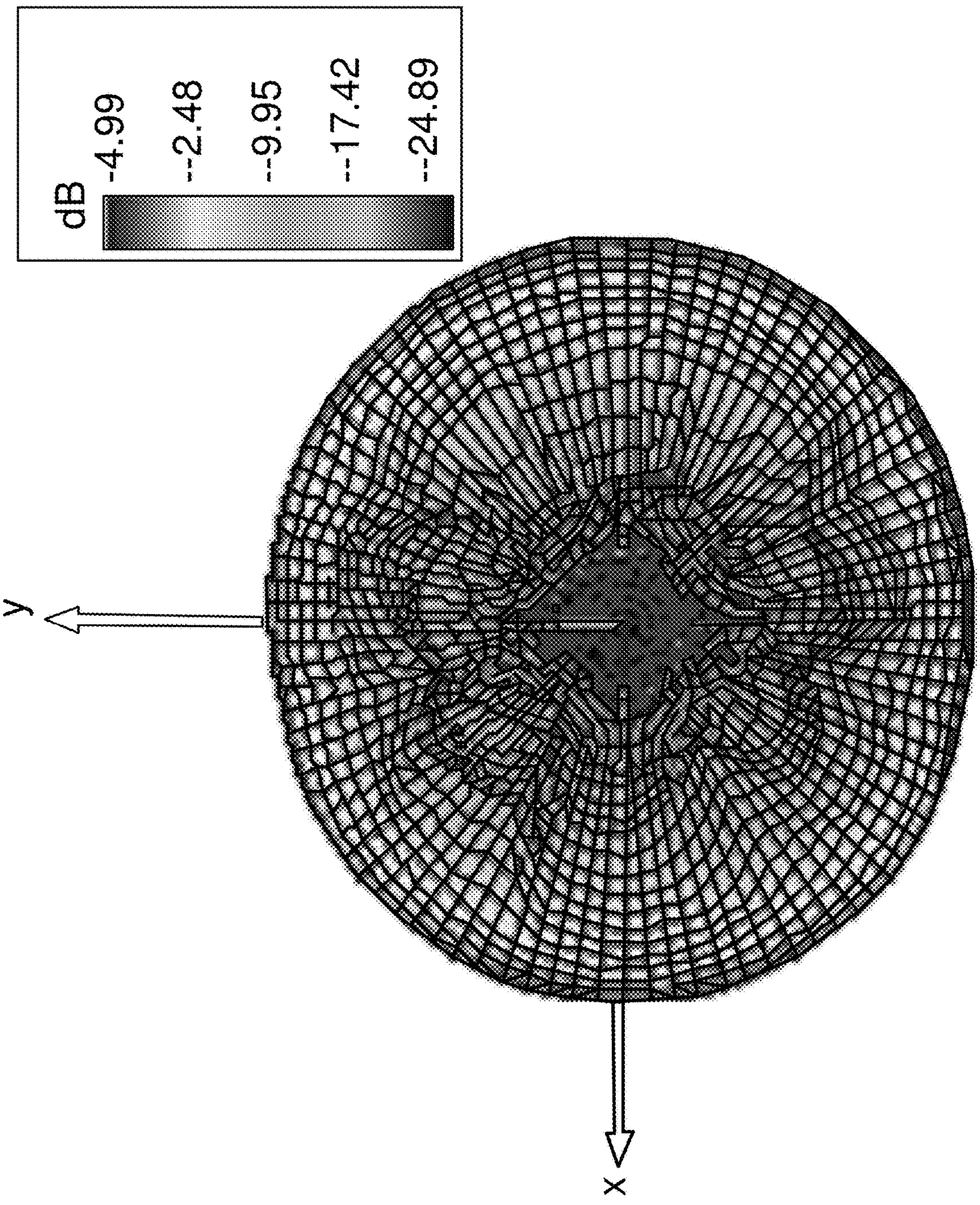
Figure 7C:
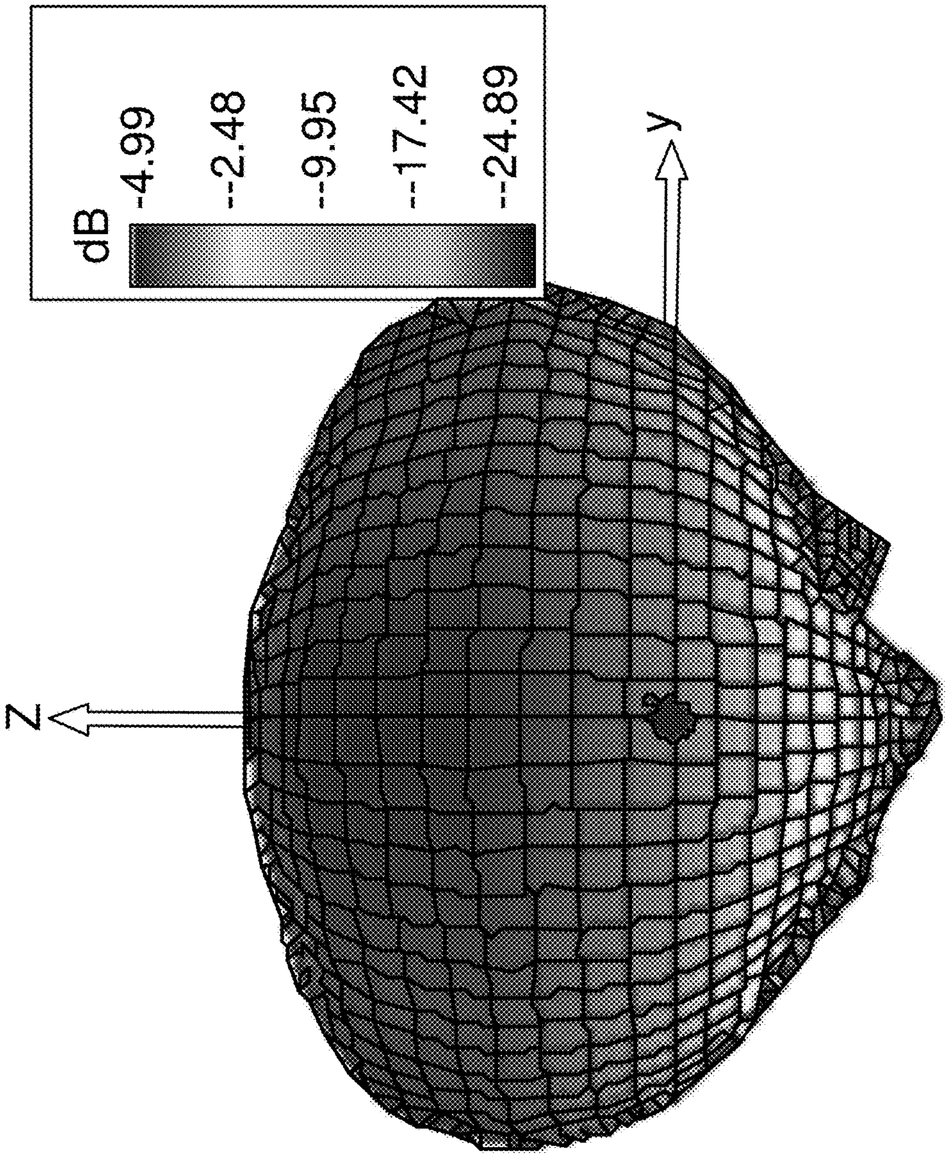
Figure 7D:
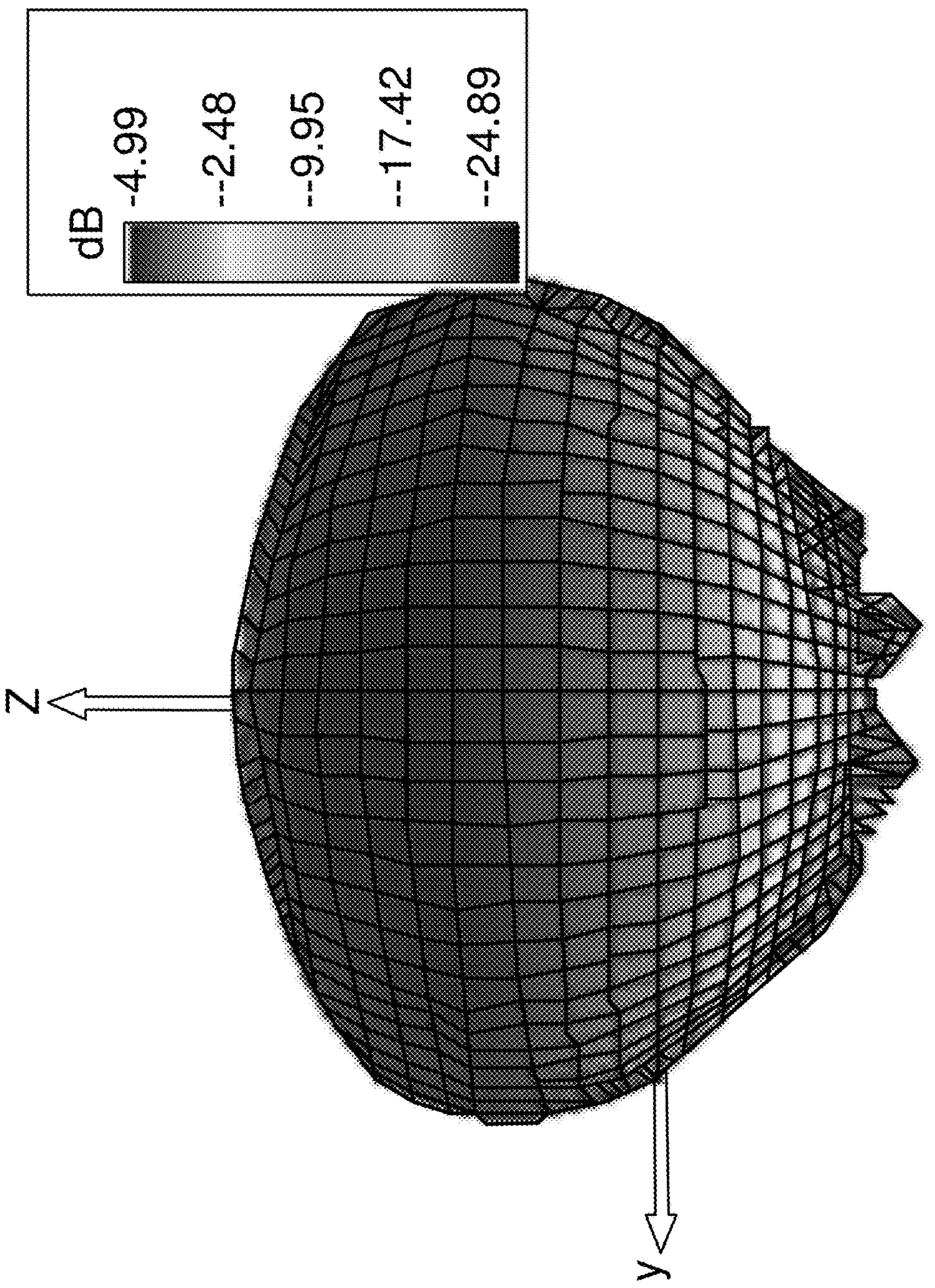
Figure 7E:
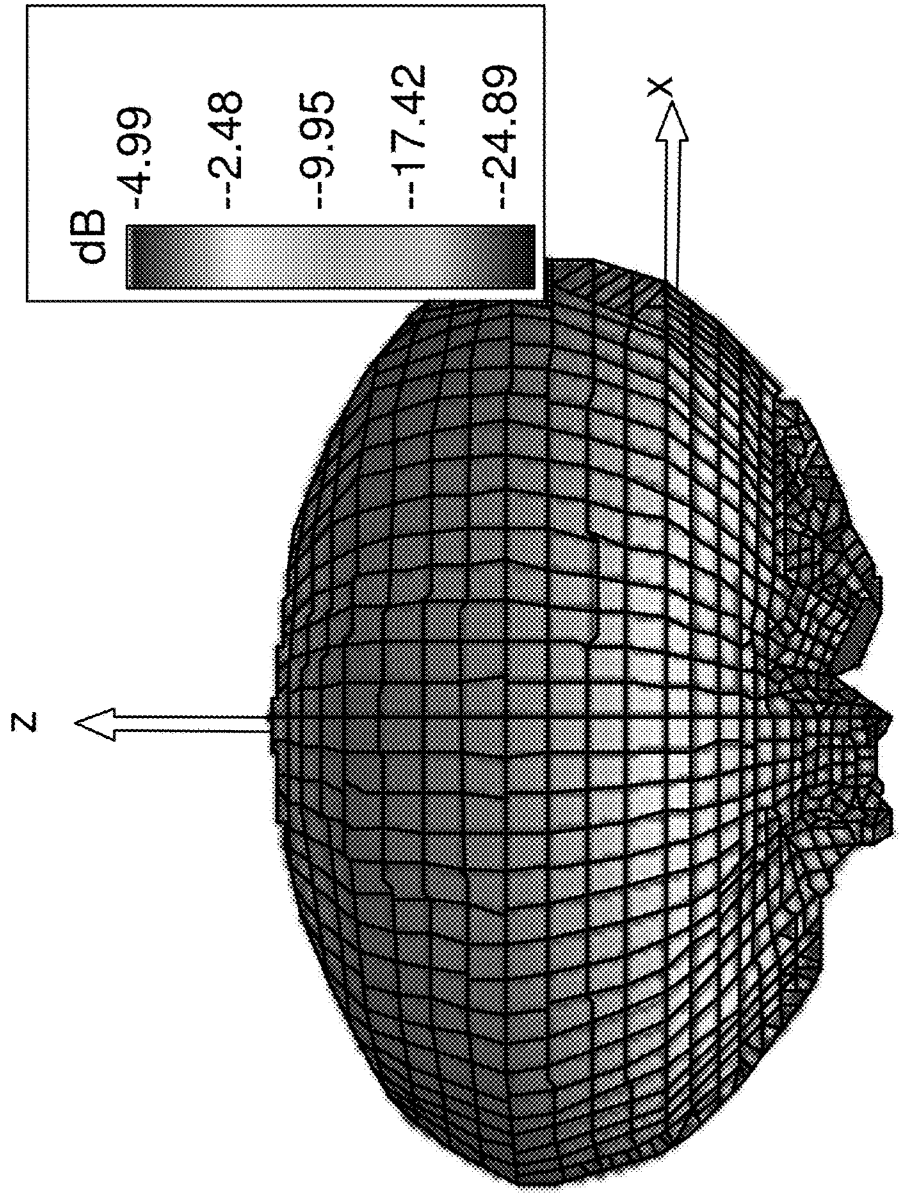
Figure 7F:
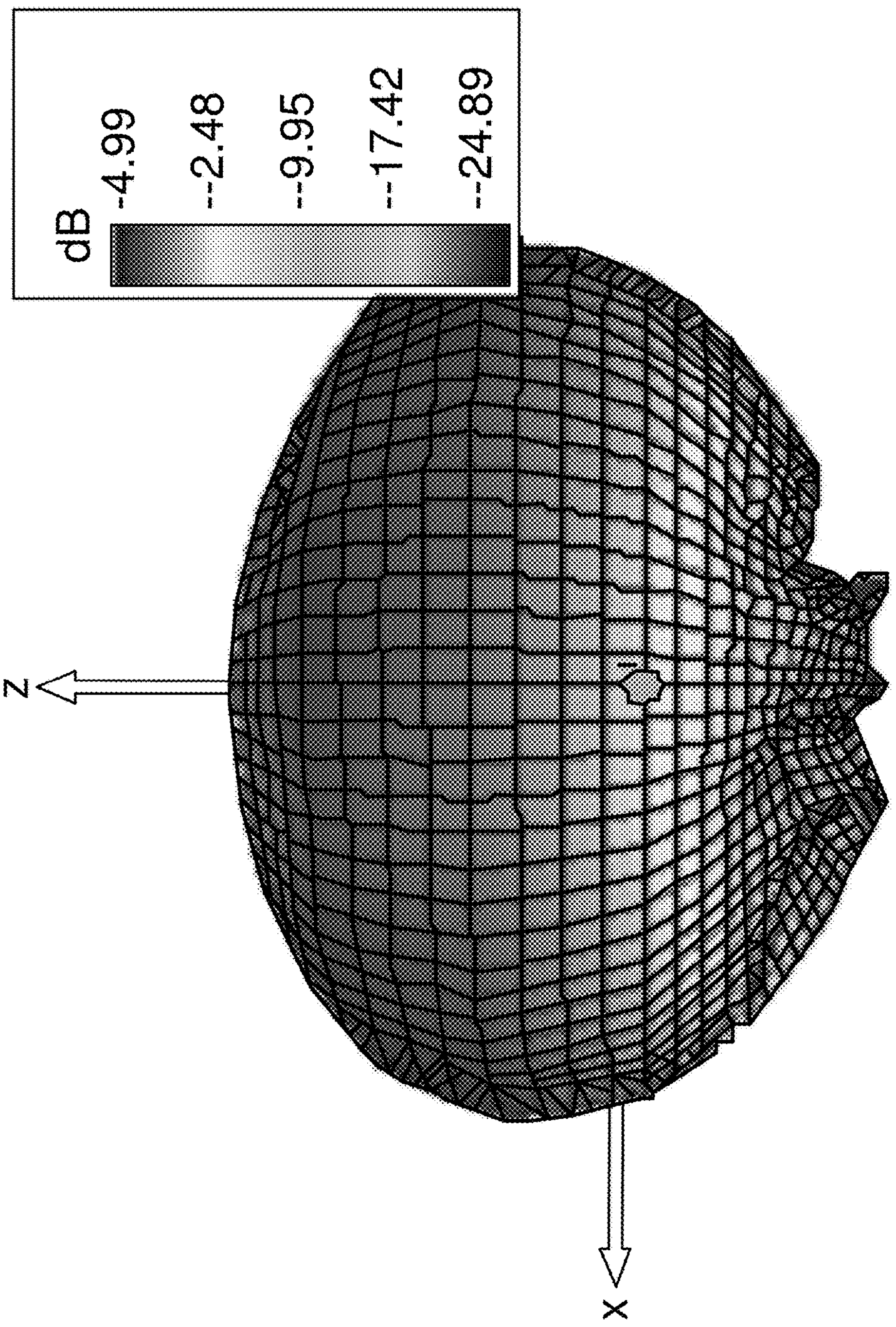

FIGS. 7A-7F show example three-dimensional (3D) radiation patterns of the disclosed antenna apparatus 10, 210 at a frequency of 700 MHz. As understood by one of skill in the art, FIGS. 7A-7F illustrate the strength and direction of electromagnetic radiation in the vicinity of the antenna apparatus 10, 210 during transmission. Specifically, FIG. 7A illustrates a 3D radiation pattern with θ and φ equal to 0° with a gain between 4.99 dB and −24.89 dB; FIG. 7B illustrates a 3D radiation pattern with θ equal to 180° and φ equal to 0° with a gain between 4.99 dB and −24.89 dB; FIG. 7C illustrates a 3D radiation pattern with θ equal to 90° and φ equal to 0° with a majority of the gain at 4.99 dB; FIG. 7D illustrates a 3D radiation pattern with θ equal to 90° and φ equal to 180° with a majority of the gain at 4.99 dB; FIG. 7E illustrates a 3D radiation pattern with θ equal to 90° and φ equal to 270° with a majority of the gain at 4.99 dB; and FIG. 7F illustrates a 3D radiation pattern with θ and φ equal to 90° with a majority of the gain at 4.99 dB. As can be seen from FIGS. 7A-7F, the disclosed novel ultra-wideband antenna apparatus 10 has quasi omnidirectional radiation patterns.

The antenna apparatus 10, and in particular the matching structure 120 comprising one or more capacitive ground structures 130 disclosed herein, provides numerous advantages over the current state of the art. For example, the disclosed matching structure 120 comprising one or more capacitive ground structures 130 provides a much simpler matching method than a traditional LC (inductor-capacitor) wideband matching circuit. Moreover, the disclosed antenna apparatus 10 uses one antenna instead of two or more antennas (and a diplexer) to cover the desired frequency range of 250 MHz to 1220 MHz. As such, the overall apparatus 10 is much simpler to implement and less costly than an apparatus requiring two or more antennas to cover the desired frequency range of 250 MHz to 1220 MHz.

In addition, as shown in FIG. 5, the disclosed antenna apparatus 10 has a very good return loss—i.e., greater than 10 dB—over the entire frequency range between 250 MHz and 1200 MHz. Moreover, the disclosed antenna apparatus 10 overcomes the problems of having bad return loss at the low end of the wideband, which could cause unwanted mismatching losses and reduce the antenna's efficiency. Thus, the disclosed apparatus 10 by having a good return loss at the low end of the wideband does not have unwanted mismatching losses and has increased antenna efficiency in comparison to other types of antennas that could be used in a mobile leakage detection system.

It should be appreciated that without the disclosed antenna apparatus 10, 210, the mobile leakage detection system's coverage would be limited to much smaller frequency bands or even single frequencies; this is undesirable as it would result in many large coverage gaps, allowing for interference to exist but not be detected until it has reached or exceeded a harmful level. Experience and follow-up investigations into HFC interference issues have revealed that when diagnosed with a wideband antenna and a receiver capable of working with them and its frequency range (such as the apparatus 10, 210 and system 400 disclosed herein), the interference source(s) can be located and fixed in an efficient manner. Without the advantages of the disclosed principles, long and expensive troubleshooting sessions may occur and potential litigation may be needed to resolve disputes over the interference and its effects.

It should be appreciated that the disclosed antenna apparatus 10, 210 can be used in a non-mobile (i.e., static mount) system if desired. All that is required is that the capacitive ground structures 130 of the matching structure 120 be mounted to a suitable metal structure (e.g., a metal plate, pole or similar device) such that they are positioned slightly above the structure to create a capacitance for the antenna matching discussed herein.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An ultra-wideband antenna apparatus comprising:

a monopole antenna portion formed on a first side of a printed circuit board;

a ground pad formed on the first side of the printed circuit board and spaced apart from the antenna portion; and a capacitive ground structure-based matching structure comprising a first portion that is vertical and coupled to the ground pad and a second portion that is horizontal and configured to be maintained above a metal reflector by a predetermined distance to form a capacitance between the second portion and the metal reflector for impedance matching of the antenna portion, the first portion and the second portion having a same length and same thickness.

2. The antenna apparatus of claim 1, wherein the capacitive ground structure-based matching structure comprises a plurality of capacitive ground structures, each capacitive ground structure having a first portion and a second portion, the first portion of at least one capacitive ground structure being coupled to the ground pad and the second portion of each of the capacitive ground structures being configured to be maintained above the metal reflector by the predetermined distance.

3. The antenna apparatus of claim 2, wherein the capacitive ground structure-based matching structure comprises four capacitive ground structures, the first portion of two of the capacitive ground structures being coupled to the ground pad, the first portion of two other capacitive ground structures being coupled to a second side of the printed circuit board, and the second portion of each capacitive ground structure being configured to be maintained above the metal reflector by the predetermined distance.

4. The antenna apparatus of claim 2, wherein each capacitive ground structure is formed of a single conductive material that is bent at a predetermined angle to form the first and second portions.

5. The antenna apparatus of claim 4, wherein the predetermined angle is a right angle.

6. The antenna apparatus of claim 4, wherein the conductive material is selected from the group consisting of aluminum, brass, copper, gold, steel, titanium, tin and stainless steel.

7. The antenna apparatus of claim 2, further comprising a housing, the housing comprising a first housing portion covering the antenna portion, ground pad and capacitive ground structure-based matching structure, and the housing having a base portion adapted to couple the first housing portion to the metal reflector such that the second portion of each of the capacitive ground structures is maintained above the metal reflector by the predetermined distance.

8. The antenna apparatus of claim 1, wherein the antenna portion is a planar circular monopole antenna coupled to an antenna output via a co-planar waveguide.

9. The antenna apparatus of claim 1, wherein the antenna apparatus has a return loss of better than 10 dB over an operating frequency range of 250 MHz to 1220 MHz.

10. The antenna apparatus of claim 1, further comprising an output adapted to be coupled to a leakage detector.

11. An ultra-wideband mobile mount antenna apparatus comprising:

a monopole antenna portion formed on a first side of a printed circuit board;

a ground pad formed on the first side of the printed circuit board and spaced apart from the antenna portion;

a capacitive ground structure-based matching structure comprising a first portion that is vertical and coupled to the ground pad and a second portion that is horizontal, the first portion and the second portion having a same length and same thickness; and a mounting mechanism adapted to maintain the capacitive ground structure-based matching structure above a metal reflector to form a capacitance between the second portion and the metal reflector;

wherein the antenna apparatus has a return loss of 10 dB or better over an operating frequency range of 250 MHz to 1220 MHz.

12. The antenna apparatus of claim 11, wherein the capacitive ground structure-based matching structure comprises a plurality of capacitive ground structures, each capacitive ground structure having a first portion and a second portion, the first portion of at least one capacitive ground structure being coupled to the ground pad and the second portion of each of the capacitive ground structures being configured to be maintained above the metal reflector by a predetermined distance.

13. The antenna apparatus of claim 12, wherein the capacitive ground structure-based matching structure comprises four capacitive ground structures, the first portion of two of the capacitive ground structures being coupled to the ground pad, the first portion of two other capacitive ground structures being coupled to a second side of the printed circuit board, and the second portion of each capacitive ground structure being configured to be maintained above the metal reflector by the predetermined distance.

14. The antenna apparatus of claim 12, wherein each capacitive ground structure is formed of a single conductive material that is bent at a predetermined angle to form the first and second portions.

15. The antenna apparatus of claim 14, wherein the predetermined angle is a right angle.

16. The antenna apparatus of claim 14, wherein the conductive material is selected from the group consisting of aluminum, brass, copper, gold, steel, titanium, tin and stainless steel.

17. The antenna apparatus of claim 12, further comprising a housing, the housing comprising a first housing portion covering the antenna portion, ground pad and capacitive ground structure-based matching structure, and the housing having a base portion adapted to cover the mounting mechanism.

18. The antenna apparatus of claim 11, wherein the antenna portion is a planar circular monopole antenna coupled to an antenna output via a co-planar waveguide.

19. The antenna apparatus of claim 11, further comprising an output adapted to be coupled to a leakage detector.

20. The antenna apparatus of claim 11, wherein the reflector is a metal portion of a vehicle.

* * * * *